(12) United States Patent
Cristescu et al.

(10) Patent No.: US 12,397,991 B2
(45) Date of Patent: Aug. 26, 2025

(54) RFID TAGS

(71) Applicant: Ocado Innovation Limited, Hatfield Herts (GB)

(72) Inventors: Ovidiu Cristescu, Hatfield (GB); Ian Parks, Hatfield (GB)

(73) Assignee: OCADO INNOVATION LIMITED, Hatfield Herts (GB)

( * ) Notice: Subject to any disclaimer, the term of this patent is extended or adjusted under 35 U.S.C. 154(b) by 958 days.

(21) Appl. No.: 17/423,955

(22) PCT Filed: Jan. 15, 2020

(86) PCT No.: PCT/EP2020/050877
§ 371 (c)(1),
(2) Date: Jul. 19, 2021

(87) PCT Pub. No.: WO2020/148315
PCT Pub. Date: Jul. 23, 2020

(65) Prior Publication Data
US 2022/0081209 A1 Mar. 17, 2022

(30) Foreign Application Priority Data

Jan. 17, 2019 (GB) .................................... 1900653

(51) Int. Cl.
*B65G 1/137* (2006.01)
*B65G 1/04* (2006.01)
(Continued)

(52) U.S. Cl.
CPC ......... *B65G 1/1371* (2013.01); *B65G 1/0464* (2013.01); *G06K 19/041* (2013.01);
(Continued)

(58) Field of Classification Search
CPC ................ B65G 1/1371; B65G 1/0464; B65G 2203/046; B65G 2203/0283; B65G 1/02;
(Continued)

(56) References Cited

U.S. PATENT DOCUMENTS

| 10,109,908 B2 | 10/2018 | Youm et al. |
| 10,913,601 B2 | 2/2021 | Suzuki |

(Continued)

FOREIGN PATENT DOCUMENTS

| BR | PI0809422 | * | 3/2020 |
| CN | 101055625 A | | 10/2007 |

(Continued)

OTHER PUBLICATIONS

Office Action issued on Jun. 27, 2023, by the Canadian Patent Office in corresponding Canadian Patent Application No. 3,127,109. (4 pages).

(Continued)

*Primary Examiner* — Jacob S. Scott
*Assistant Examiner* — Erin Morris
(74) *Attorney, Agent, or Firm* — Buchanan Ingersoll & Rooney PC (57) ABSTRACT

A radio-frequency identification (RFID) tag for semi-permanent insertion into a gap in a storage grid includes an RFID antenna; a storage medium configured to store identification data, the storage medium being connected to the RFID antenna; and a case configured to house the RFID antenna and the storage medium. The case includes: an internal surface configured to support one or both of the RFID antenna and the storage medium; one or more feet configured to limit insertion of the case into the gap in the storage grid; and one or more protrusions configured to provide resistance to case movement relative the gap.

12 Claims, 8 Drawing Sheets

(51) Int. Cl.
*G06K 19/04* (2006.01)
*G06K 19/07* (2006.01)
*G06K 19/077* (2006.01)

(52) U.S. Cl.
CPC ..... *G06K 19/0723* (2013.01); *G06K 19/0779* (2013.01); *B65G 2203/046* (2013.01)

(58) Field of Classification Search
CPC ........ B65G 1/04; B65G 1/137; G06K 19/041; G06K 19/0723; G06K 19/0779; G06K 19/077; G06K 19/045
See application file for complete search history.

(56) References Cited

U.S. PATENT DOCUMENTS

| | | | |
|---|---|---|---|
| 2002/0060629 A1* | 5/2002 | Pfeiffer | G06K 19/07758 340/572.1 |
| 2007/0252704 A1 | 11/2007 | Nagae | |
| 2008/0135551 A1 | 6/2008 | Yoshida et al. | |
| 2015/0288055 A1 | 10/2015 | Youm et al. | |
| 2018/0060718 A1 | 3/2018 | Akamatsu et al. | |
| 2019/0047786 A1 | 2/2019 | Suzuki | |

FOREIGN PATENT DOCUMENTS

| | | | | |
|---|---|---|---|---|
| CN | 101181954 | A | | 5/2008 |
| CN | 201270036 | Y | | 7/2009 |
| CN | 102736061 | A | | 10/2012 |
| CN | 203699123 | U | | 7/2014 |
| CN | 104979630 | A | | 10/2015 |
| EP | 2006793 | A1 | | 12/2008 |
| ES | 2568804 | | * | 5/2016 |
| JP | 2014131933 | A | | 7/2014 |
| JP | 2019001655 | A | | 1/2019 |
| KR | 100793464 | B1 | | 1/2008 |
| KR | 20090093741 | A | | 9/2009 |
| KR | 20100024479 | | * | 3/2010 |
| KR | 20120070367 | A | | 6/2012 |
| KR | 20160040690 | A | | 4/2016 |
| KR | 20170130598 | A | | 11/2017 |
| WO | 0242995 | A1 | | 5/2002 |
| WO | 2011070881 | A1 | | 6/2011 |
| WO | 2015019055 | A1 | | 2/2015 |
| WO | 2016166312 | A1 | | 10/2016 |
| WO | 2017150006 | A1 | | 9/2017 |
| WO | WO-2018154574 | A1 | * | 8/2018 ............ B25J 9/1035 |

OTHER PUBLICATIONS

Office Action (Examination Report No. 1) issued on May 31, 2022, by the Australian Patent Office in corresponding Australian Patent Application No. 2020209403. (3 pages).

Great Britain Combined Search and Examination Report under Sections 17 and 18(3) issued in corresponding Great Britain Patent Application No. 1900653.5 dated Jul. 15, 2019. (6 pages).

International Search Report (PCT/ISA/210) and Written Opinion (PCT/ISA/237) mailed on Apr. 15, 2020, by the European Patent Office as the International Searching Authority for International Application No. PCT/EP2020/050877. (13 pages).

Office Action issued on Oct. 11, 2022, by the Canadian Patent Office in corresponding Canadian Patent Application No. 3,127,109. (3 pages).

Office Action (Examination Report No. 2) issued on Oct. 20, 2022, by the Australian Patent Office in corresponding Australian Patent Application No. 2020209403. (3 pages).

Office Action issued on Feb. 19, 2024, by the Korean Patent Office in corresponding Korean Patent Application No. 10-2021-7025993, and an English Translation of the Office Action. (19 pages).

First Office Action issued on Aug. 22, 2023, by the Chinese Patent Office in corresponding Chinese Patent Application No. 202080011151.0, and an English Translation of the Office Action. (10 pages).

Office Action (Request for the Submission of an Opinion) issued on Aug. 6, 2024, by the Korean Patent Office in corresponding Korean Patent Application No. 10-2021-7025993, and en English Translation of the Office Action. (9 pages).

* cited by examiner

RFID TAGS

This application claims priority from UK patent application number GB1900653.5, filed 17 Jan. 2019, the contents of which are incorporated herein by reference.

The invention relates to radio-frequency identification (RFID) tags. In particular, it relates to RFID tags suitable for use with a storage and retrieval system.

BACKGROUND

RFID tags may be used to store and transmit data, such as information relating to a product or device to which the RFID tag is attached or in which the RFID tag is embedded. An RFID tag may for example be configured to store identification data in the form of an identification number, a name or other information which enables the tagged product or device to be distinguished from other products or devices. The data may be transmitted to an RFID tag reader or scanner which receives the data, interprets the data and/or transfers the data to a further device for processing.

The claimed RFID tags, methods, computer programs and systems are intended to provide improvements relative to known tags, methods, computer programs and systems.

SUMMARY

According to an embodiment, there is provided a radio-frequency identification (RFID) tag as claimed in claim 1. According to a further embodiment, there is provided a method as claimed in claim 8. According to another embodiment, there is provided a computer program. According to a yet further embodiment, there is provided a system as claimed in claim 10. Optional features are set out in the dependent claims.

BRIEF DESCRIPTION OF THE DRAWINGS

The claimed RFID tags, methods, computer programs and systems will now be described in detail with reference to examples, in which:

DETAILED DESCRIPTION

The present embodiments represent the applicant's preferred examples of how to implement RFID tags, but they are not necessarily the only examples of how that could be achieved.

Figure 1:
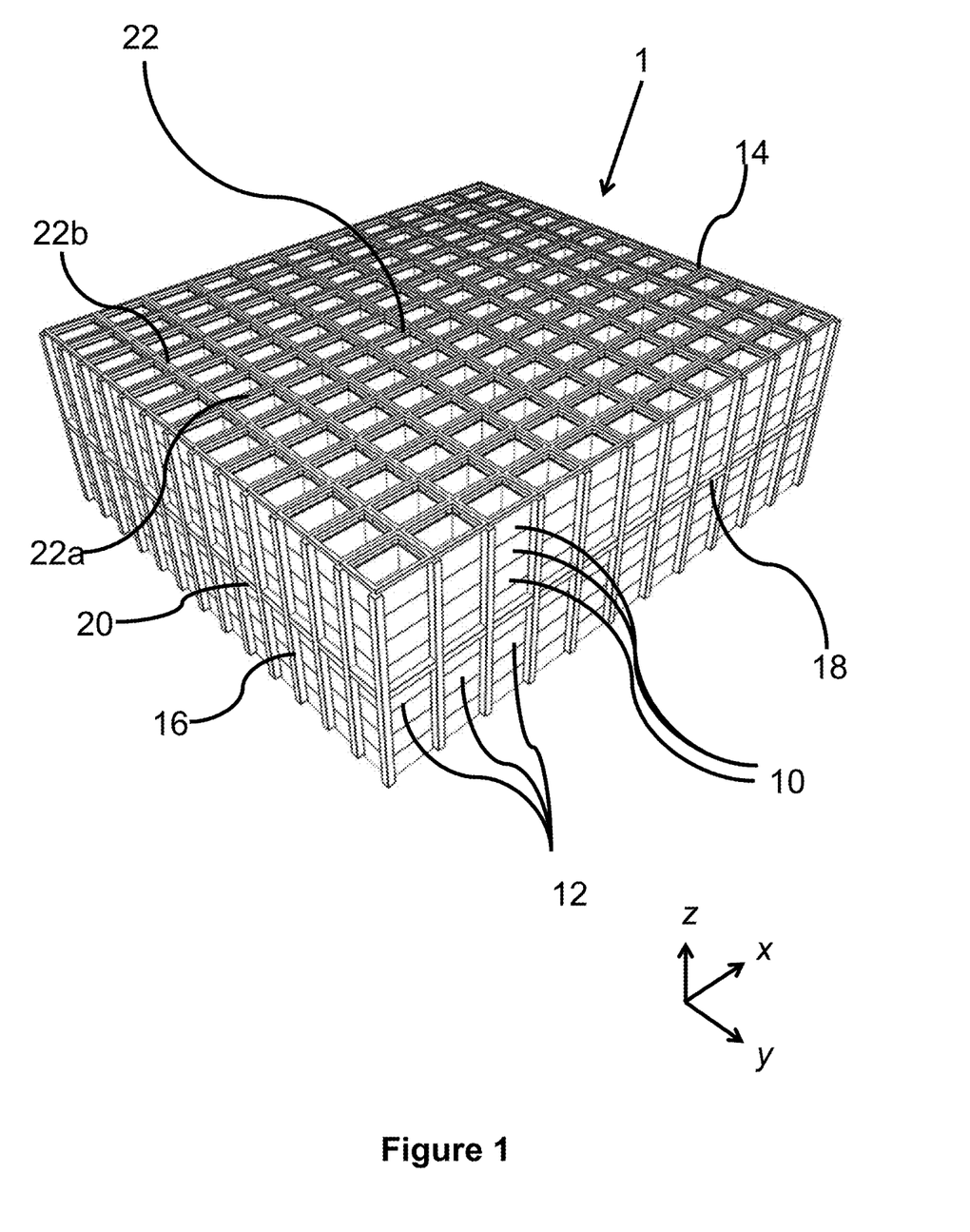
FIG. 1 schematically illustrates a storage grid of a storage and retrieval system.

A storage grid 1 of a storage and retrieval system is illustrated in FIG. 1. The illustrated storage grid 1 includes a frame structure 14 comprising a plurality of upright members 16 that support horizontal members 18, 20. A first set of parallel horizontal members 18 is arranged orthogonally to a second set of parallel horizontal members 20 to form a plurality of horizontal grid structures supported by the upright members 16. The members 16, 18, 20 are typically manufactured from metal. Containers 10 are stacked in substantially vertical stacks or columns 12 between the members 16, 18, 20 of the frame structure 14, so that the frame structure 14 guards against horizontal movement of the stacks 12 of containers 10, and guides or constrains vertical movement of the containers 10.

The illustrated storage grid 1 also includes a plurality of rails or tracks 22 arranged in a grid pattern above the stacks 12 of containers 10, the grid pattern comprising a plurality of grid spaces, each stack 12 of containers 10 being located within a footprint of only a single grid space.

Figure 2:
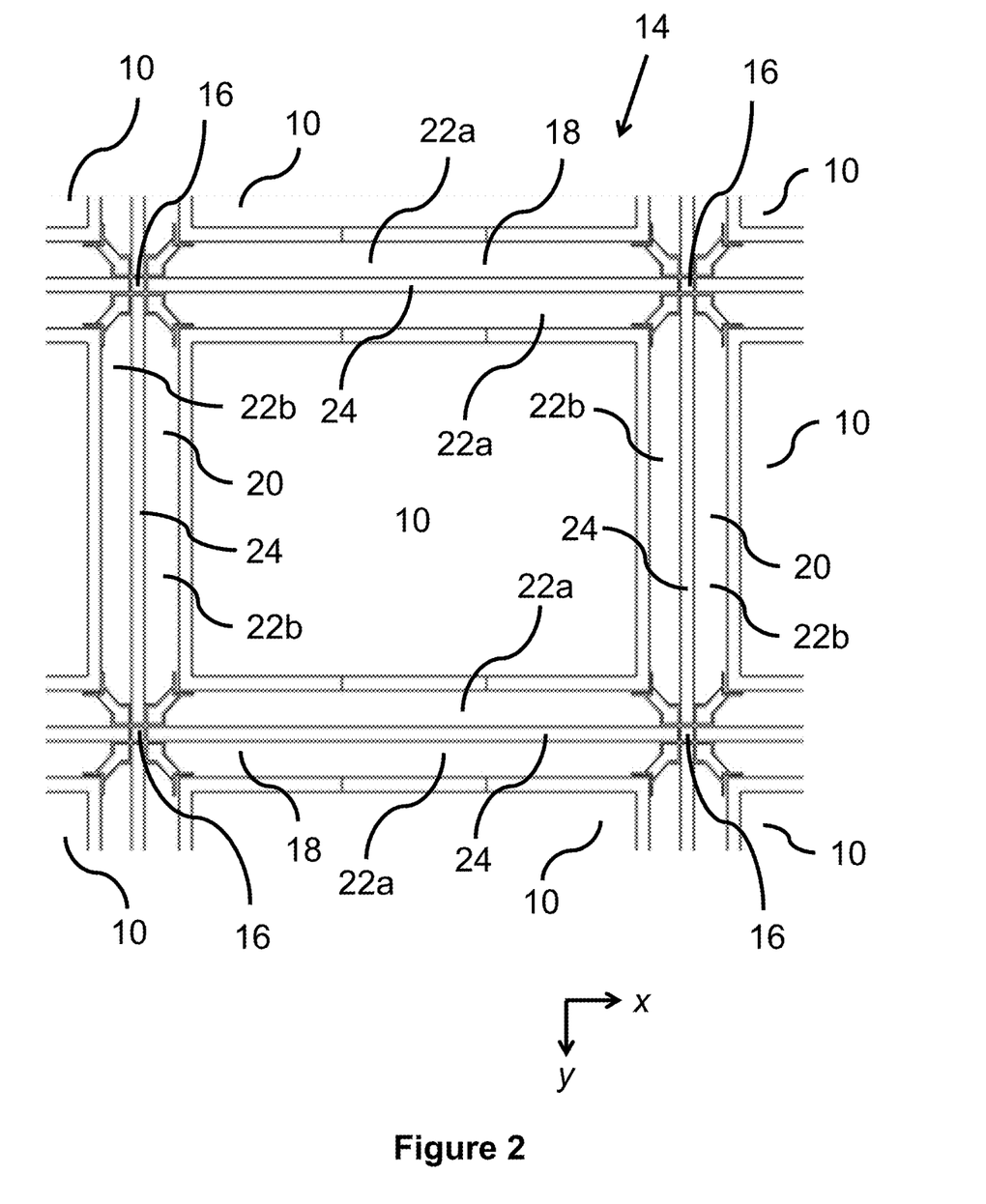
FIG. 2 schematically illustrates tracks of the storage grid of FIG. 1.

FIG. 2 provides a plan view of the arrangement of the members 16, 18, 20 on the top layer of the storage grid 1, showing the relative positions of the members 16, 18, 20 in more detail. In the illustrated embodiment, upright members 16 are arranged at four corners of a rectangle formed by parallel, neighbouring pairs of horizontal members 18 and parallel, neighbouring pairs of horizontal members 20. The corresponding stack of containers 10 for each grid space is located within the rectangle defined by the horizontal members 18, 20. The illustrated pattern is repeated across some or all of the storage grid 1. In the illustrated embodiment, the top-most horizontal members 18 of the storage grid 1 provide a first set of tracks 22a extending in a first direction (substantially along or parallel to the x-axis illustrated in FIG. 1 and FIG. 2), and the top-most horizontal members 20 provide a second set of tracks 22b extending in a second, substantially orthogonal direction (substantially along or parallel to the y-axis illustrated in FIG. 1 and FIG. 2). In some examples separate components may be placed on top of the top-most horizontal members 18, 20 to provide the tracks 22a, 22b.

Figure 3A:
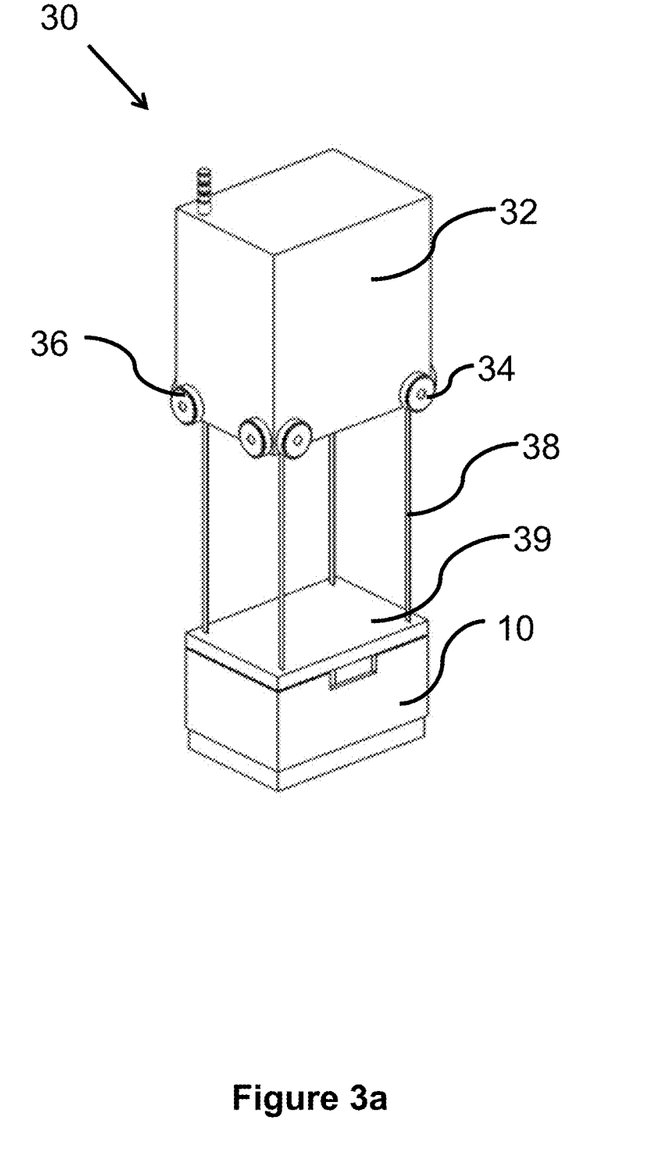
FIG. 3a schematically illustrates a robotic load-handling device for use with the storage grid of FIG. 1.
Figure 3B:
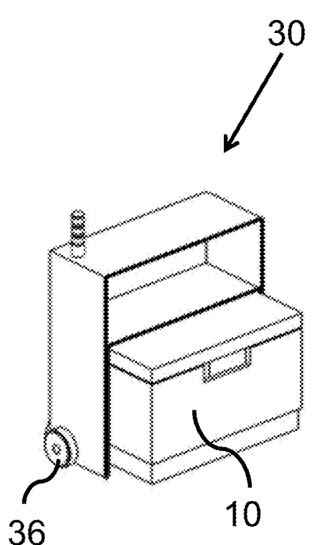
FIG. 3b schematically illustrates the robotic load-handling device of FIG. 3a in a cutaway view, with a container in a container-receiving space of the robotic load-handling device.
Figure 3C:
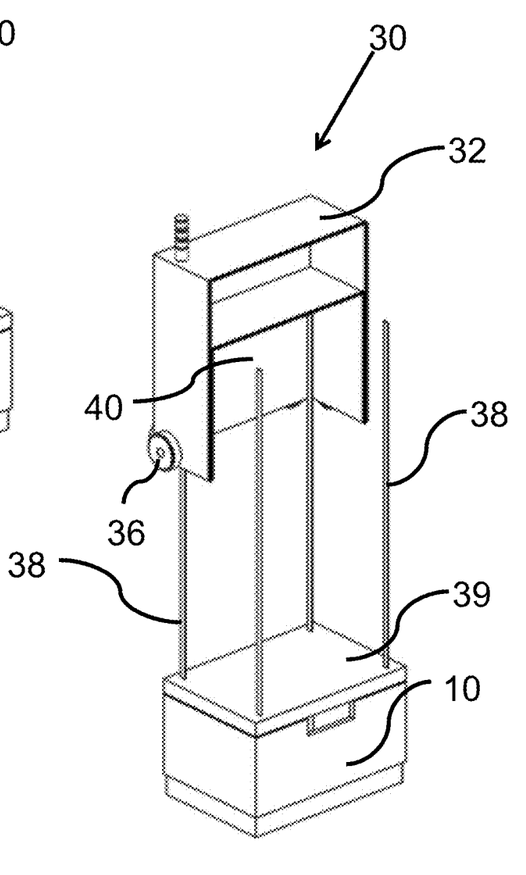
FIG. 3c schematically illustrates the robotic load-handling device of FIG. 3a in a cutaway view, with a container being lowered from a container-receiving space of the robotic load-handling device.

Robotic load-handling devices ("robots" or "bots") 30 having first and second sets of wheels 34 and 36 are configured to move laterally on the rails or tracks 22 above the stacks 12, and to move containers 10 relative to the storage grid 1 using the bots' wheels 34 and 36 and respective container-lifting mechanisms which allow at least one container 10 to be lifted into a container-receiving space 40 within a body 32 of a respective bot 30. The container-lifting mechanism may for example comprise one or more extendible and retractable vertical supports 38 which can be extended away from or retracted into the body 32 of the bot 30 to lower or raise a gripping device 39. The gripping device 39 may be configured to engage the at least one container 10, such that when the gripping device 39 is lowered or raised by the vertical supports 38 a gripped container 10 is correspondingly lowered or raised. An example of such a bot 30 is illustrated in FIG. 3a, with the bot's container-lifting mechanism shown in an extended configuration and engaging a container 10. FIGS. 3b and 3c show the same bot 30 with part of its body 32 cut away to reveal the container-receiving space 40, with (in FIG. 3b) the corresponding container-lifting mechanism in a retracted configuration (such that the corresponding container 10 is in a raised position, in the container-receiving space 40 in the body 32 of the bot 30) and (in FIG. 3c) the corresponding container-lifting mechanism in an extended configuration (such that the corresponding container 10 is lowered, relative to the body 32 of the bot 30).

Figure 4:
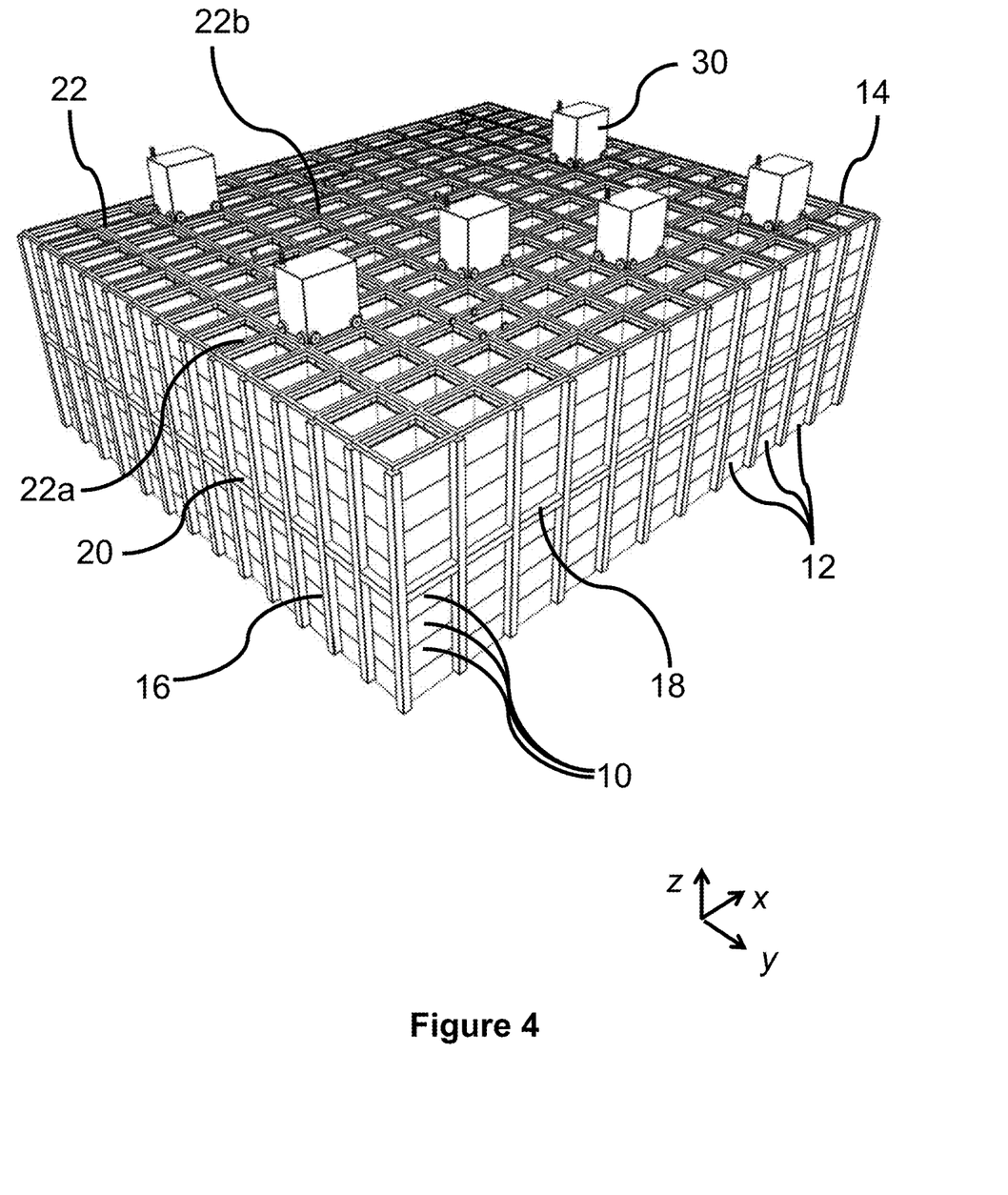
FIG. 4 schematically illustrates a storage grid of a storage and retrieval system, with a plurality of robotic load-handling devices as illustrated in FIGS. 3a to 3c on tracks of the storage grid.

As illustrated in FIG. 4, multiple bots 30 may be configured to move across the top of the frame structure 14 of a storage grid 1, along tracks 22a and 22b. In order to coordinate the movement of multiple bots 30, the bots 30 themselves and/or a control system configured to control one or more of the multiple bots 30 must know the bots' respective locations on top of the storage grid 1. This location or position information may enable bots 30 to: travel to specific stacks 12 and retrieve particular containers 10; to avoid collisions with other bots; and/or to avoid moving beyond the storage grid 1 and falling off the grid 1 (e.g. if, due to space, cost or other constraints, no barriers or other similar movement-constraining means are provided at the outer perimeter of the grid 1).

To provide a mechanism by which the bots 30 are able to determine where they are on the storage grid 1, each bot may be provided with one or more RFID tag readers or scanners, and a plurality of RFID tags may be provided across the top of the storage grid 1. As will be described in more detail below, the RFID tags may be inserted into suitably sized gaps in the storage grid 1, such as gaps 24 provided in tracks 22a, 22b (see FIG. 2).

As the bots 30 move across the storage grid 1, the bots' respective RFID tag readers may read signals from one or more of the RFID tags as the bots pass the RFID tags.

The RFID tags may be fixed relative to the storage grid 1, such that the RFID tags' positions do not change, and thus provide a series of fixed reference points for the bots 30. The positions of the RFID tags may for example be recorded in a map, database or other record which can be consulted by a processor. The positions of the RFID tags may be defined in various different ways, such as in terms of distances along the tracks 22a, 22b, and/or in terms of which grid space or grid spaces they coincide with or are closest to. For example, if an RFID tag is located in a gap 24 between tracks 22a or 22b, the record may include identification data for one or both of the two grid spaces that the RFID tag is located between. As another example, if the RFID tag is located at an outer edge of a grid space at the outer edge of the storage grid 1, the record may include identification data for only the single grid space which the RFID tag is located at or adjacent to. As a further example, if the RFID tag is located at or close to a junction or crossroads between tracks 22a and 22b, the record may include identification data for one or more of the two or four grid spaces that meet at the junction, and/or identification data for the corresponding upright member 16. As a still further example, a location of an RFID tag may be identified in the record with one or more measurements (e.g. in metres, yards or feet) taken from a known "origin" of the storage grid 1 (e.g. a known corner, an edge or a central point).

As explained, there may be various ways that a particular location of an RFID tag on a storage grid 1 may be recorded. In some examples, the location data (identifying the location of the RFID tag) may be encoded in a storage medium of the RFID tag and be transmittable to an RFID tag reader which comes sufficiently close to the RFID tag.

In other examples, the RFID tag may contain data which enables a particular RFID tag to be identified (e.g. a character string which is particular to that RFID tag), and the location data may be stored in a record against the RFID tag's identification data. The process of installing RFID tags on a storage grid 1 may include a process of writing the location data to the RFID tags after installation (e.g. when their positions are known). In other examples, the process of installing the RFID tags may require the installer to install specific RFID tags at specific, pre-determined locations, and/or to record the locations that specific RFID tags are installed at. In some examples, a storage medium of an RFID tag may be encoded with both location data and data which enables the particular RFID tag to be identified.

The bots 30 may use information read from one or more RFID tags they have encountered while moving across the grid 1 to determine where they are on the grid 1.

The number of RFID tags provided across the storage grid 1 may determine the precision with which the bots 30 can locate themselves, and/or the speed with which they can determine their locations and/or their directions of travel. For example, if at least one RFID tag is provided for each grid space in the storage grid 1, a bot 30 may be able to determine its position relatively quickly and precisely, whereas if RFID tags are provided only for every second or third grid space, the bot 30 may need to move several grid spaces before being able to identify where it is going. In some examples, an RFID tag may be provided along each side of each four-sided grid space (possibly excluding edge cells, which may have fewer RFID tags). In other examples, RFID tags may be provided only along one, two or three sides of each grid space, and/or only at corners or junctions between grid spaces. One or more RFID tag readers may be mounted on each bot 30 in such a position that the RFID tags on the storage grid 1 can be read by the RFID reader(s) as the corresponding bot 30 travels along the corresponding sections of tracks 22a, 22b. For example, if the bots' RFID tag readers are provided at bottom-right corners of the bots 30, RFID tags may correspondingly be provided at bottom-right corners of grid spaces. The numbers of RFID tags per grid space and the number of RFID tag readers per bot 30 may be chosen to balance the cost of additional tags and/or readers against the reliability of the individual tags and/or readers and/or the need for redundancy and/or against the need for quickly identifying which direction a bot 30 is moving in.

Figure 5:
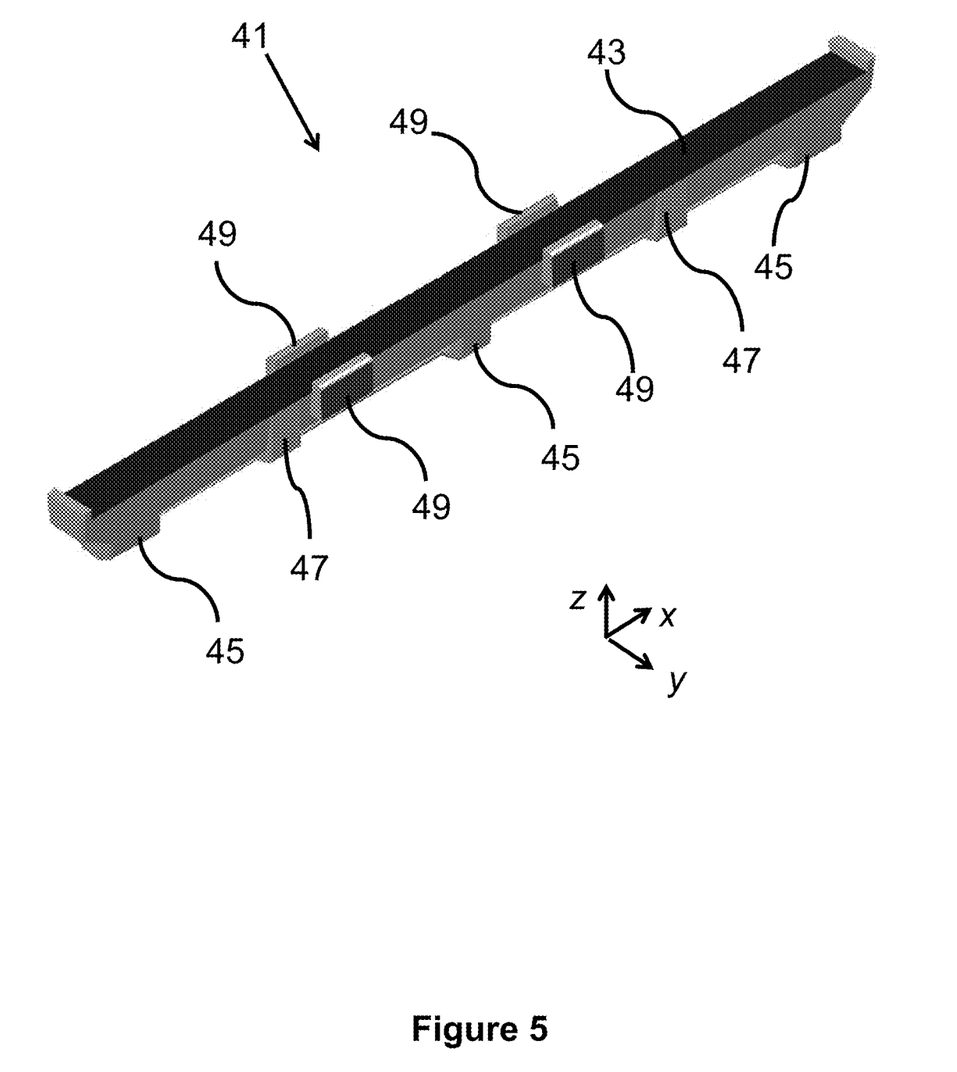
FIG. 5 schematically illustrates a first case member of an RFID tag in a top-perspective view.
Figure 6:
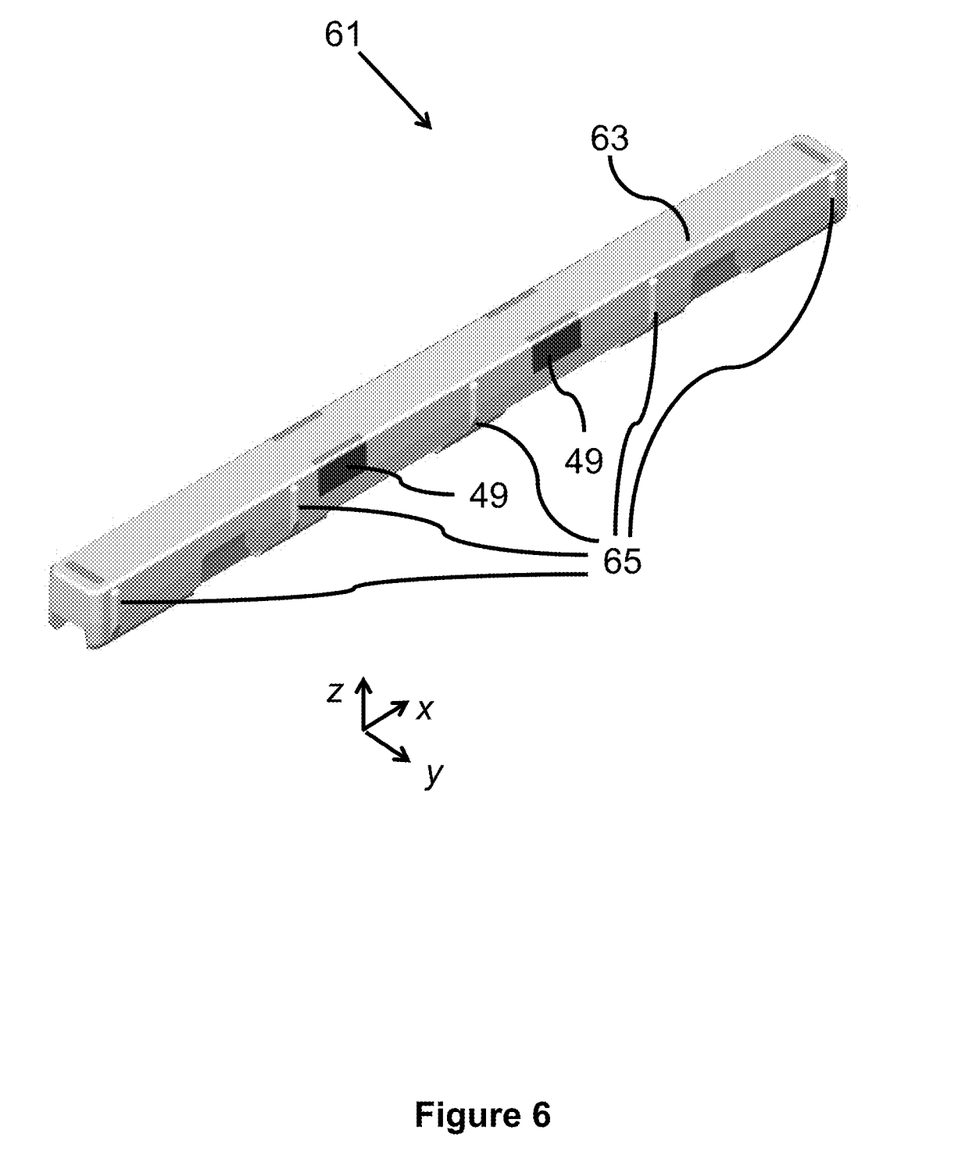
FIG. 6 schematically illustrates an RFID tag in a top-perspective view.
Figure 7:
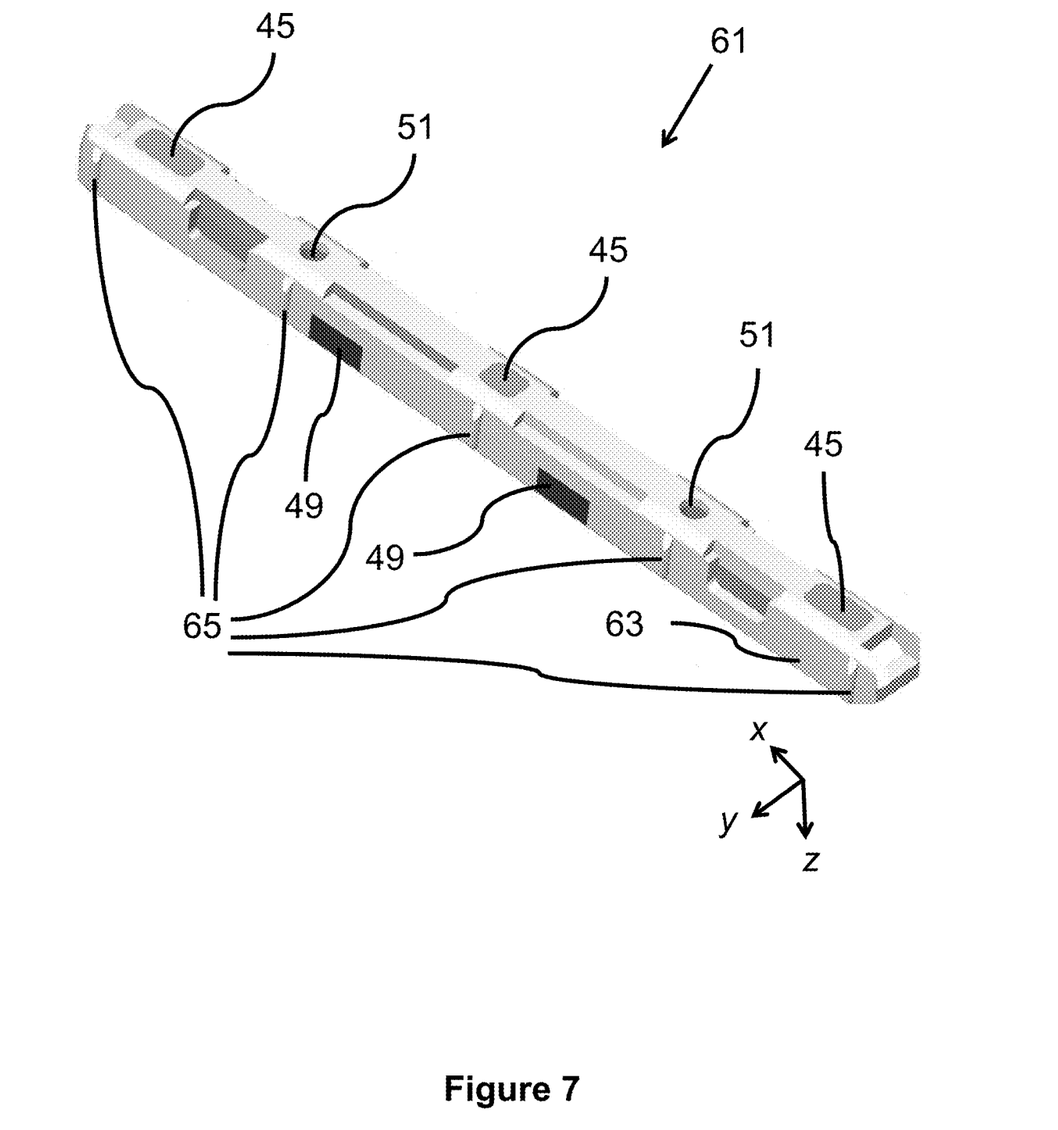
FIG. 7 schematically illustrates an RFID tag in a bottom-perspective view.

FIGS. 5 to 7 illustrate an example of an RFID tag 61. FIG. 5 shows a first case member 41 of the RFID tag 61. The first case member 41 includes a surface 43 which is arranged to support one or both of an RFID antenna and a storage medium of the RFID tag 61. The RFID antenna and the storage medium may for example be mounted on one or more printed circuit boards (PCBs), one or more plastic inlays and/or one or more other supports which may be mounted on the surface 43. The RFID antenna may, when an RFID tag reader passes within sufficiently close proximity and/or remains within sufficiently close proximity for a sufficient period of time, transmit identification data stored on the storage medium to the nearby RFID tag reader. The RFID antenna and storage medium may preferably be a passive arrangement, i.e. one requiring no direct power source and instead relying on electromagnetic waves received at the antenna (e.g. from a nearby RFID tag reader) to cause and/or facilitate transmission of the identification data. In other examples, the RFID antenna and storage medium may be an active arrangement, i.e. one with a direct power source of its own, the direct power source powering transmission of the identification data. A passive arrangement may advantageously provide greater freedom of location of the RFID tag 61 on the storage grid 1 and/or reduced size of the RFID tag 61, since no power cabling or battery needs to be provided for the RFID tag 61. A passive arrangement may also advantageously reduce the cost of manufacture and/or ongoing use of the RFID tag 61, and/or simplify the installation of the RFID tag 61, since the RFID tag 61 need only be positioned at the desired point on the storage grid 1—no further equipment or installation is involved. An active arrangement may advantageously provide greater flexibility regarding the position of the RFID tag 61 within each grid space and/or the position of the RFID tag reader on the bot 30, since the antenna of the RFID tag 61 may be capable of transmitting the identification data further than an antenna of a passive arrangement would be able to.

The first case member 41 also includes a plurality of feet 45 which are configured to limit insertion of the RFID tag 61 into a gap 24 in the storage grid 1. The feet 45 may for example protrude in the negative z-direction to a specific extent to provide a known minimum distance between the effective contact surface of the bottom of the first case member 41 (i.e. the bottoms of the feet 45) and the internal surface 43 which is configured to support the RFID antenna. This may advantageously improve the probability that the RFID antenna will be and remain sufficiently close to an RFID tag reader of a passing bot 30 that the RFID tag reader can read data transmitted by the RFID antenna of the RFID tag 61. This may be particularly advantageous in environments where the gap 24 in the storage grid 1 comprises a metal material which may interfere with or attenuate RFID signals transmitted by the RFID antenna, such that it would be disadvantageous for the RFID tag 61 to be forced too far into the gap 24.

The feet 45 may also provide a known distance in the positive z-direction between the effective contact surface of the bottom of the first case member 41 (the bottoms of the feet 45) and an upper surface or greatest z-height of the RFID tag 61. This may significantly improve the ease and speed of installation of RFID tags in a storage grid 1, as well as the reliability of the RFID tag 61 being able to communicate data to an RFID tag reader of a bot 30, since an RFID tag installer can push the RFID tag 61 into a gap 24 until the feet 45 contact a bottom surface of the gap 24—the installer does not need to perform any measurements or adjustments to ensure that the RFID tag 61 will be within reading distance of a passing RFID tag reader or to ensure that the RFID tag 61 does not protrude sufficiently far that it will be struck and potentially damaged or displaced by the wheels 34, 36 of a bot 30 passing on the tracks 22a or 22b between which the RFID tag 61 is positioned (in gap 24).

The feet 45 may furthermore provide a protective and/or reinforcing function to help minimise the risk of the RFID tag 61 and its internal components (e.g. RFID antenna and storage medium) being crushed by the wheels 34, 36 of a passing bot 30. The feet 45 may for example effectively extend in the z-direction from the bottom to the top of the first case member 41, to provide relatively robust and/or rigid supports for the first case member 41. The feet 45 (and possibly also the first case member 41) may preferably be made of a relatively rigid material, such as a polycarbonate material, to provide a relatively inflexible structure. The feet may be integrally formed with the first case member 41 or may be attached to it. The feet may in some embodiments extend upwards in the z-direction beyond the internal surface 43 to provide additional protection for the internal surface 43 and any components mounted on the internal surface 43, e.g. by providing one or more features or surfaces which a wheel 34, 36 of a bot 30 may contact before and in preference to one or more components mounted on the internal surface 43.

FIG. 6 illustrates a second case member 63 which has been overmoulded onto the first case member 41 illustrated in FIG. 5 to create a case which substantially surrounds the RFID antenna and the storage medium supported by the surface 43 of the first case member 41. The second case member 63 includes a plurality of protrusions 65 which protrude outwards from the two longer sides of the second case member 63 illustrated in FIG. 6. The illustrated protrusions 65 extend along most of the vertical height of the two longer side walls and are tapered at a lower end. The taper at the lower end may help facilitate insertion of the RFID tag 61 into a gap 24. The protrusions 65 are configured to provide resistance to movement of the second case member 63 (and thus also the first case member 41 onto which the second case member 63 is overmoulded) within a gap 24. The protrusions may comprise a relatively deformable material which can be deformed by application of force to insert the RFID tag 61 (including the first and second case members 41, 63) into a gap 24. The protrusions 65, once deformed by contact with walls of a gap 24 as described above, may then provide resistance to movement of the RFID tag 61 along the gap 24 (i.e. in the x- or y-directions illustrated in FIG. 1 and FIG. 2) and/or into or out of the gap 24 (i.e. in the z-direction illustrated in FIG. 1 and FIG. 2). The deformation of the protrusions 65 may lead to an increased surface area of the second case member 63 being in contact with walls of a gap 24, and therefore to increased friction between the second case member 63 and the walls of the gap 24. This may advantageously help to ensure that the RFID tag 61 is not displaced from its position of installation, e.g. by a passing bot 30 if the bot 30 comes into direct contact with the RFID tag 61 or by vibration of the grid 1 due to movement of one or more bots 30 along the tracks 22a, 22b provided on the storage grid 1. The second case member 63 and the protrusions may preferably comprise a thermoplastic material to provide a relatively deformable structure over the relatively rigid and inflexible structure of the first case member 41.

Preferably materials are chosen for the first case member 41 and the second case member 63 which do not significantly expand or contract with temperature changes.

In some embodiments, one or more protrusions may also or alternatively be provided on the other (shorter) sides of the second case member 63, e.g. if the RFID tag 61 is to be inserted into a space which is enclosed on more sides than the illustrated gaps 24 are.

The first case member 41 illustrated in FIG. 5 additionally includes features 47, 49. The features 47, 49 may serve one or more purposes. For example, one or more of the features 47, 49 may be alignment features configured to facilitate alignment of overmoulding apparatus with the first case member 41. For example, the illustrated features 47 may be configured to allow an overmoulding apparatus to hold or support the first case member 41 using the features 47, such that the overmoulding apparatus can overmould the second case member 63 over the first case member 41. The features 47 may for example be sized and/or positioned such that at least part of one or more of the features 47 will not be directly overmoulded, such that the overmoulding apparatus can continue to contact and support the first case member 41 while the second case member 63 is overmoulded over the first case member 41. Similarly, the illustrated features 49 may be provided to help with alignment of the first case member 41 and an overmoulding apparatus and/or to help ensure that, after the overmoulding process has been completed, the first and second case members 41, 63 cannot move relative to one another. For example, the features 49 may be configured to protrude into or through corresponding apertures which are to be formed in the second case member 63, thus constraining relative movement of the first and second case members 41, 63. The first and second case members 41, 63 together form a case of the illustrated RFID tag 61, the case defining an interior within which the internal surface 43 is located, the RFID antenna and the storage medium being supported by the internal surface 43.

FIG. 7 shows, in perspective view, the underside of the RFID tag 61 after the overmoulding process has been completed. In the illustrated example, the bottoms of the feet 45 of the first case member 41 are flush with the bottom of the overmoulded second case member 63 (i.e. flush in the z-direction). In other examples, the feet 45 may protrude beyond the bottom of the overmoulded second case member 63 (i.e. beyond the bottom surface of the second case member 63, in the negative z-direction), or be slightly recessed inside the overmoulded second case member 63 (i.e. above the bottom of the overmoulded second case member 63, in the positive z-direction). In all cases, the feet 45 serve to limit the extent to which the RFID tag 61 can be inserted into a gap 24, by providing a relatively rigid, incompressible structure which can limit or prevent further insertion into a gap 24 by relatively incompressibly abutting a bottom surface of the gap 24. If the feet 45 are recessed inside the overmoulded second case member 63 and the overmoulded second case member 63 comprises a resiliently deformable material which deforms as an installation force is applied to the RFID tag 61, the feet 45 will still ensure that the minimum distance between the surface 43 and the bottom contact surface of the RFID tag 61 is maintained.

FIG. 7 shows a further set of features 51 in the form of holes 51. Like features 47, 49, the holes 51 may be used to facilitate the overmoulding of the second case member 63 over the first case member 41. For example, the holes 51 may extend through the bottom of the second case member 63 and the first case member 41, allowing supports to be inserted into the first and second case members 41, 63 and to support both of the case members 41, 63 as the overmoulding process is completed.

Advantageously, an RFID tag 61 with a case comprising relatively rigid, inflexible material configured to support the RFID antenna and storage medium and to resist forcing of the RFID tag 61 beyond a bottom surface of a gap 24 and a relatively deformable material including protrusions configured to deform to resist movement of the RFID tag 61 relative to the gap 24 in the storage grid 1 may provide a robust and easy-to-install RFID tag 61 which is capable of withstanding crushing forces (e.g. if run over by the wheels 34, 36 of a bot 30) due to the deformability of the relatively deformable material (i.e. the overmoulded second case member 63 in the illustrated examples) over the relatively rigid material (i.e. the first case member 41 in the illustrated examples) and which is capable of resisting forces which would move the RFID tag 61 within or out of a gap 24 after insertion (e.g. vibration or crushing forces due to the movement of bots 30 over the storage grid 1), thereby providing an RFID tag 61 which continues to reliably perform its intended function of providing a fixed reference point for moving bots 30.

Advantageously, the illustrated RFID tag 61 may be relatively inexpensive to manufacture, since the overmoulding of the second case member 63 over the first case member 41 may be automatable, and thus the process of securing the RFID antenna and storage medium within the overall case formed by the first and second case members 41, 63 may require minimal human input. The illustrated RFID tag 61 may furthermore help ensure that an RFID signal can always be received from the RFID tag 61 by helping to maintain the RFID antenna and storage medium a consistent height above the bottom of the gap 24 in the storage grid 1 and therefore at a consistent distance from bots 30 moving over the top of the storage grid 1. The illustrated RFID tag 61 moreover advantageously does not require an adhesive to affix the RFID tag 61 in place relative to the storage grid 1, since the protrusions 65 formed of a deformable material deform to increase the surface area of the RFID tag 61 that is in contact with the walls defining the gap 24, thereby increasing the friction between the RFID tag 61 and the gap 24 and holding the RFID tag 61 in place. The RFID tag 61 also does not require an installation tool to install it in a gap 24 in a storage grid 1—the RFID tag 61 can be pushed into the gap 24 by hand.

As previously discussed, multiple RFID tags 61 may be distributed across a frame structure 14 of a storage grid 1 to provide, in conjunction with RFID tag readers provided on one or more bots 30, a system which allows the bots 30 and/or a controller of one or more of the bots 30 to determine the bots 30 locations on the frame structure 14 of the storage grid 1.

In some embodiments, the illustrated and described system of RFID tags 61 on a storage grid 1 and RFID tag readers mounted on bots 30 moving across a storage grid 1 may be one of several systems or data sources which bots 30 and/or a controller of bots 30 can use to determine locations of bots 30 on a storage grid 1. For example, a further system may be provided which relies on a different mechanism (e.g. a GPS-like or mesh network-like system which determines positions using triangulation of signals received from different transmitters or beacons) to determine the location of one or more bots 30 on a storage grid 1. In such cases, the system of RFID tags 61 and RFID tag readers may be used to provide an initial or confirmatory indication of a bot's location, and/or to provide a location if the other system is unable to do so, and/or to provide a faster, more reliable or more precise indication of a bot's location.

The illustrated and described RFID tags 61 may therefore, by virtue of their features (including feet 45 and protrusions 65), be suitable for semi-permanent insertion into a gap 24 in a storage grid 1 to allow the movement of bots 30 to be monitored using the RFID tags 61 over an indefinite period of time. The RFID tags 61 may, due to their robustness of construction (including relative rigidity of feet 45 and relative deformability of protrusions 65) be capable of relatively long service in the environment of a storage grid 1 where the RFID tags 61 may be vibrated or struck by moving bots 30. The RFID tags 61 may for example be capable of operating (and remaining substantially spatially fixed) in the environment of a storage grid 1 for a number of weeks, months or even years, such as over a significant portion of the expected lifetime of a storage grid 1. This may advantageously minimise time spent reinstalling RFID tags on a storage grid 1, which may help to maximise "uptime" of the storage grid 1, i.e. time during which the storage grid 1 is in use, with one or more bots 30 operating on top of the storage grid 1 to move containers between locations.

Although in the illustrated embodiment the case is provided by two case members 41, 63, in other embodiments, the case may be a single-member case. In further embodiments there may be more than two case members which collectively form the case. Furthermore, two or more case members may be connected or attached to one another in one or more different ways—they need not necessarily be attached by an overmoulding process.

Although in the illustrated embodiment the protrusions 65 are provided on the second case member 63, in other embodiments one or more of the protrusions 65 may be provided on the first case member 41 (i.e. on the same case member as the feet 45).

In such embodiments, the second case member 63 may have the primary purpose of covering or enclosing the internal surface which is configured to support the RFID antenna and/or the storage medium. Conversely, in some embodiments both the feet 45 and the protrusions 65 may be provided on the second case member 63. In other embodiments, the case may comprise only a single member, in which case both the feet 45 and the protrusions 65 may be provided on the same, single case member, with no further case members for enclosing the RFID antenna and/or storage medium—the single case member may itself provide the internal surface 43 without requiring enclosing by another case member. In further embodiments, the case may comprise more than two members, in which case the feet 45 and/or the protrusions 65 may be provided on one or more of the different case members.

Although in the illustrated embodiments the feet 45 have rounded rectangular or rectelliptical cross sections, in other embodiments the feet may take different shapes or structures. For example, in some embodiments, the feet may have rectangular, circular, elliptical, triangular, square or any other cross sections. Additionally, the cross sections of different feet may be different from each other. Furthermore, although in the illustrated embodiments the feet 45 are solid in cross section, in other embodiments one or more of the feet may be at least partially hollow in cross section, e.g. to provide within a given foot a hole such as the holes 51 illustrated in FIG. 7. In some embodiments, the feet may not have constant cross sections along their entire z-lengths. For example, in some embodiments, the feet may be deliberately tapered, or splayed at the lower (in the z-direction) ends, e.g. to provide a specific surface area for contacting the bottom of a gap 24.

Although in the illustrated embodiments there are three feet 45—one at or near each end (along the x-axis) of the RFID tag 61, and one in or near the middle (along the x-axis)—in other embodiments more or fewer feet may be provided. For instance, it may be advantageous for more or fewer feet to be provided based on the cross-sectional shape and/or other features of the feet. In some embodiments, for example, the feet may take the form of rods (e.g. cylindrical, triangular or square rods) with relatively narrow cross sections, in which case it may be preferable for more feet to be provided. The position of the feet along the x- and y-axes of the first case member 41 and/or the lengths of the feet in the z-axis may be determined based upon a desired effect of the feet. For example, it may be preferable for the feet to be relatively evenly spaced along the x- and y-axes and for the feet to be substantially identical in length along the z-axis if the desired effect is for the RFID tag 61 to sit squarely within a gap 24, with the bottoms of the feet at substantially the same z-axis height as each other and the top of the RFID tag 61 at substantially the same z-axis height along the x- and y-axes of the RFID tag 61. In other examples, it may be preferable for the feet to have different lengths, e.g. if the desired effect is for a first x-direction end of the RFID tag 61 to have a relatively large z-axis height relative to the opposite x-direction end of the RFID tag 61, e.g. if the RFID antenna is mounted at the first end of the RFID tag 61 and it is desired to increase the probability of the RFID antenna being within transmitting/receiving distance of a passing bot's RFID tag reader.

Although in the illustrated embodiments there are five protrusions 65 on each of the longer sides of the RFID tag 61, in other embodiments there may more or fewer protrusions. As mentioned above, in some embodiments one or more protrusions may additionally be provided on the shorter sides of the RFID tag 61. The number of protrusions and/or the x- and/or y-widths of the protrusions may be chosen to try to optimise resistance to movement of the RFID tag 61 within a gap 24 while also allowing initial insertability of the RFID tag 61 into the gap 24. Although the illustrated protrusions extend substantially in the z-direction (i.e. vertically along the longer sides of the RFID tag 61), in other embodiments one or more of the protrusions may extend at least partially in a different direction. For example, it may be advantageous in some embodiments for one or more of the protrusions to extend at an angle to the vertical (i.e. at an angle to the z-axis), and/or to change direction of extension along the length of the protrusion, e.g. by being angled or curved.

Although the illustrated protrusions include a substantially-constant-y-width section above the tapered section, in other embodiments one or more of the protrusions may have variable widths, e.g. to create a ribbed or otherwise variable outer profile of the protrusion(s). This may for example help to increase the ability of the protrusion(s) to resist movement of the RFID tag 61 within a gap 24 by increasing traction between the walls of the gap 24 and the protrusions.

In some embodiments, the protrusions may be configured to engage with specific features on walls of a gap 24, e.g. corresponding grooves or recesses. This may help to optimise resistance to movement of the RFID tag 61 within the gap 24.

It is envisaged that any one or more of the variations described in the foregoing paragraphs may be implemented in the same embodiment of an RFID tag.

In this document, the language "movement relative to a gap" is intended to include movement within the gap, e.g. sliding along the gap, as well as movement into or out of a gap.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y.

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

The invention claimed is:

1. A radio-frequency identification (RFID) tag for semi-permanent insertion into a gap between first and second tracks in a storage grid, the RFID tag comprising:
    an RFID antenna;
    a storage medium configured to store identification data, the storage medium being connected to the RFID antenna; and
    an elongated case configured to house the RFID antenna and the storage medium, the elongated case including:
        a first case member including an internal surface configured to support one or both of the RFID antenna and the storage medium, and one or more feet configured to limit insertion of the elongated case when inserted into the gap between the first and second tracks in the storage grid; and
        a second case member including one or more protrusions configured to provide resistance to movement of the elongated case relative to the gap between the first and second tracks in the storage grid when inserted into the gap.

2. An RFID tag as claimed in claim 1, wherein the one or more protrusions comprise:
    resiliently deformable protrusions configured to be deformed to allow the elongated case to be inserted into the gap between the first and second tracks in the storage grid, and configured to provide resistance to movement of the elongated case out of the gap between the first and second tracks when the case has been inserted into the gap.

3. An RFID tag as claimed in claim 1, wherein each of the one or more protrusions comprises:
    a tapered section configured to facilitate insertion of the elongated case when inserted into the gap between the first and second tracks in the storage grid.

4. An RFID tag as claimed in claim 1, wherein the one or more feet comprise:
    rigid feet configured to provide a minimum distance between an effective contact surface of the one or more feet and the internal surface.

5. An RFID tag as claimed in claim 1, comprising:
    a printed circuit board or a plastic inlay wherein the RFID antenna and the storage medium are mounted on the printed circuit board or the plastic inlay which is supported by the internal surface of the first case member.

6. An RFID tag as claimed in claim 1, wherein the first case member comprises a rigid material, and the second case member comprises a deformable material, wherein the second case member is overmoulded onto the first case member.

7. An RFID tag as claimed in claim 6, wherein the first case member includes one or more additional features configured to facilitate one or more of: supporting the first case member during an overmoulding process; alignment of an overmoulding apparatus with the first case member; and alignment of the second case member with the first case member.

8. A method of manufacturing a radio-frequency identification (RFID) tag for semi-permanent insertion into a gap between first and second tracks in a storage grid, the method comprising:
    providing an RFID antenna;
    providing a storage medium configured to store identification data, the storage medium being connected to the RFID antenna; and
    providing an elongated case configured to house the RFID antenna and the storage medium, the case includes:
        a first case member including an internal surface configured to support one or both of the RFID antenna and the storage medium and one or more feet configured to limit insertion of the case into the gap between the first and second tracks in the storage grid; and
        a second case member including one or more protrusions configured to provide resistance to movement of the case relative to the gap between the first and second tracks in the storage grid.

9. A method as claimed in claim 8, further comprising:
    overmoulding the second case member over the first case member, and
    wherein providing the first case member comprises:
        providing one or more additional features on the first case member, the one or more additional features including at least an alignment feature configured to align the first case member with the second case member and align the first case member during an overmoulding process, and wherein overmoulding the second case member comprises:
            aligning an overmoulding apparatus with the first case member using the one or more additional features.

10. A system comprising:
    a storage grid having first tracks and second tracks; and
    a plurality of RFID tags, each RFID tag including:
        an RFID antenna;
        a storage medium configured to store identification data, the storage medium being connected to the RFID antenna; and
        an elongated case configured to house the RFID antenna and the storage medium, the elongated case including:
            a first case member including an internal surface configured to support one or both of the RFID antenna and the storage medium, and one or more feet configured to limit insertion of the case when inserted into a gap between the first tracks and the second tracks in the storage grid; and
            a second case member including one or more protrusions configured to provide resistance to movement of the case relative to the gap between the first tracks and the second tracks in the storage grid when inserted into the gap.

11. The system as claimed in claim 10, comprising:
    a plurality of robotic load-handling devices.

12. The system as claimed in claim 11, wherein each robotic load-handling device comprises:
    an RFID tag reader.

* * * * *